United States Patent
Shortell et al.

(10) Patent No.: US 11,361,103 B2
(45) Date of Patent: Jun. 14, 2022

(54) SYSTEMS AND METHODS FOR USE WITH STAND-IN NETWORK IDENTITIES

(71) Applicant: MASTERCARD INTERNATIONAL INCORPORATED, Purchase, NY (US)

(72) Inventors: Aaron Shortell, Long Island City, NY (US); Kristen Metropoulos, Brooklyn, NY (US); Andrew Haimes, Brooklyn, NY (US); Nicole M. Yap, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 211 days.

(21) Appl. No.: 16/796,330

(22) Filed: Feb. 20, 2020

(65) Prior Publication Data
US 2021/0264053 A1    Aug. 26, 2021

(51) Int. Cl.
*G06F 21/62* (2013.01)
*G06F 21/78* (2013.01)
*G06F 21/31* (2013.01)

(52) U.S. Cl.
CPC .......... *G06F 21/6245* (2013.01); *G06F 21/31* (2013.01); *G06F 21/78* (2013.01)

(58) Field of Classification Search
CPC ....... G06F 21/6245; G06F 21/31; G06F 21/78
USPC .......................................................... 726/28
See application file for complete search history.

(56) References Cited

U.S. PATENT DOCUMENTS

| 2006/0041930 A1* | 2/2006 | Hafeman ............ G06F 21/6245 726/2 |
| 2016/0098577 A1* | 4/2016 | Lacey ................. G06F 21/6245 726/28 |

\* cited by examiner

*Primary Examiner* — Jacob Lipman
(74) *Attorney, Agent, or Firm* — Harness, Dickey & Pierce, P.L.C.

(57) ABSTRACT

Systems and methods are provided for implementing stand-in network identities, whereby independent users are permitted to act on behalf of dependent users. One exemplary computer-implemented method includes receiving a request from an independent user to provision personal identifying information (PII) for a dependent user to a first communication device. The method then includes authenticating the dependent user at a second different communication device, receiving the PII from the dependent user in response to the authentication, and transmitting the PII to a secure data structure. The method further includes authenticating the independent user at the first communication device, retrieving the PII for the dependent user from the secure data structure in response to the authentication, and transmitting the PII to the first communication device, whereby the PII may be stored in a secure element at the first communication device for use by the independent user on behalf of the dependent user.

16 Claims, 8 Drawing Sheets

SYSTEMS AND METHODS FOR USE WITH STAND-IN NETWORK IDENTITIES

FIELD

The present disclosure is generally directed to systems and methods for use with stand-in network identities, whereby independent users are permitted to act on behalf of dependent users.

BACKGROUND

This section provides background information related to the present disclosure which is not necessarily prior art.

Users are known to rely on their identities for a variety of activities, from accessing networks to opening new accounts. When the users present their identities, in connection with such activities, providers associated with the activities often authenticate the users to the presented identities to ensure, with a degree of certainty, that the users are who they say they are. When the authentication is successful, the users are permitted to proceed in the activities, which, in turn, are tied to their identities. From time to time, users act on behalf of other users. For example, a parent may act on behalf of a child in one or more activities tied to an identity of the child, or vice-versa the child may act on behalf of the parent in one or more activities tied to an identity of the parent. In such instances, a relationship, legal or otherwise, is relied upon to permit one user to act on behalf of the other user.

DRAWINGS

The drawings described herein are for illustrative purposes only of selected embodiments and not all possible implementations, and are not intended to limit the scope of the present disclosure.

Figure 1:
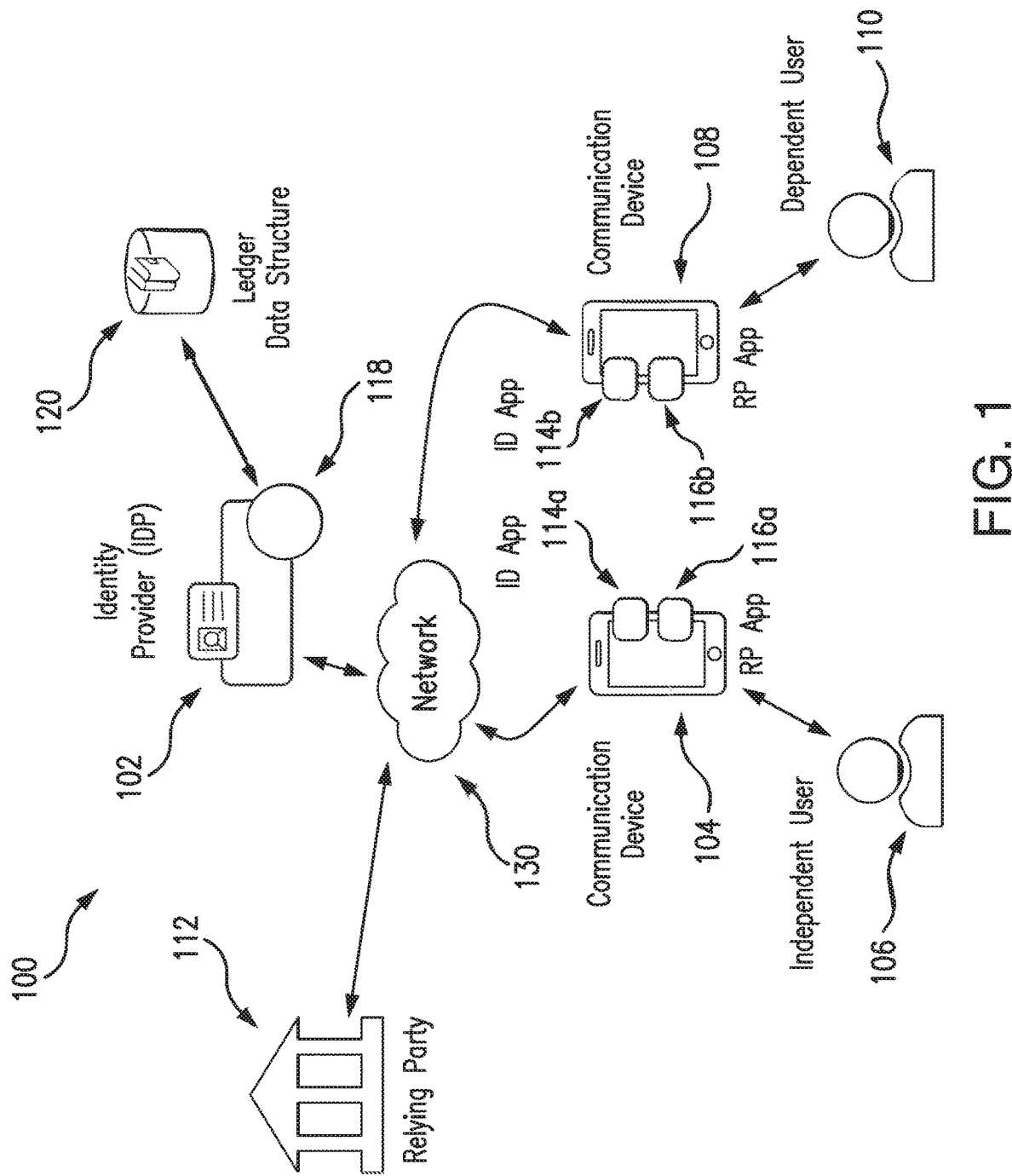
FIG. 1 illustrates an exemplary system of the present disclosure suitable for use in assigning permissions associated with identities of dependent users, to independent users, whereby the independent users are then permitted to act on behalf of the dependent users.
Figure 7:
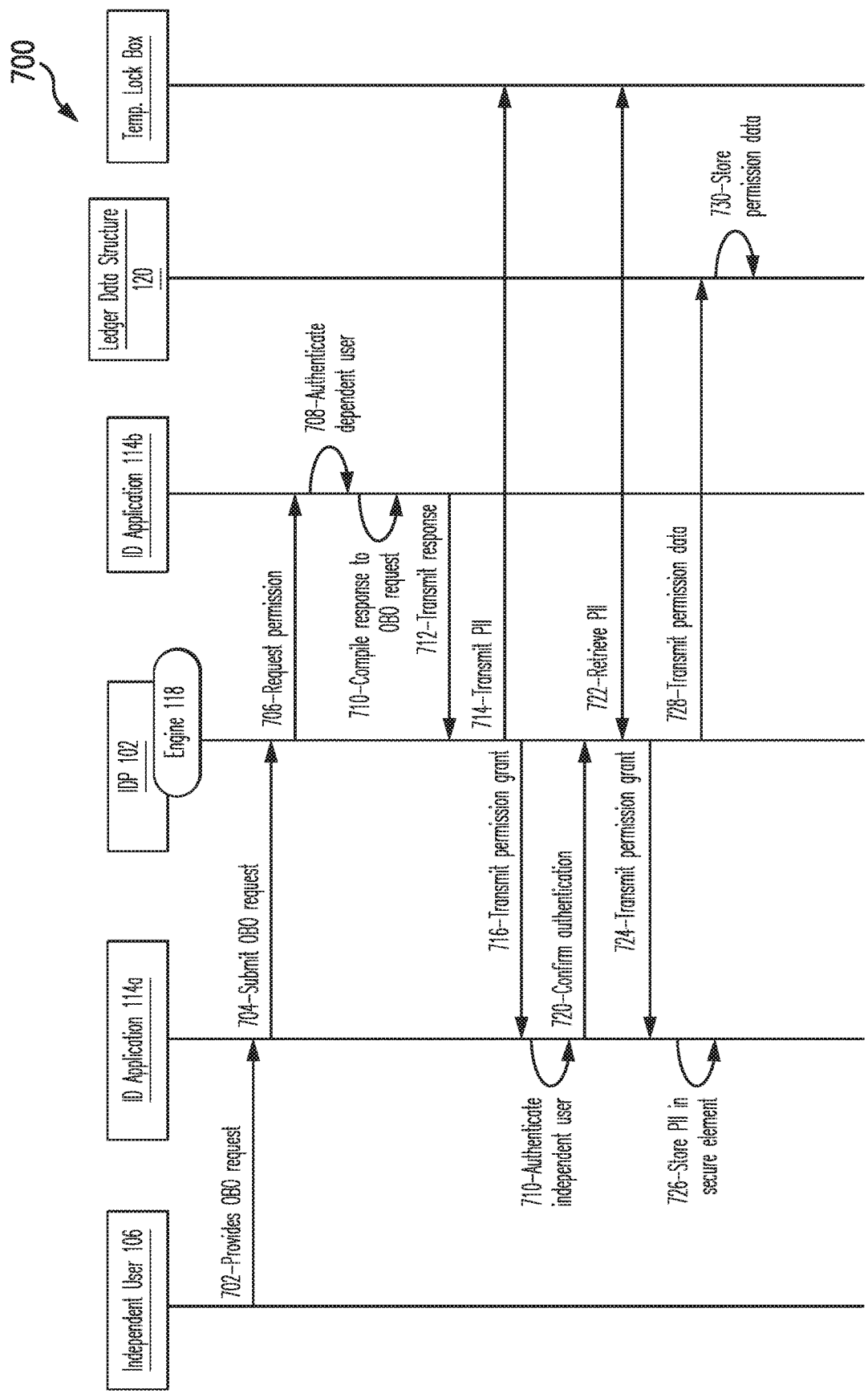
Figure 8:
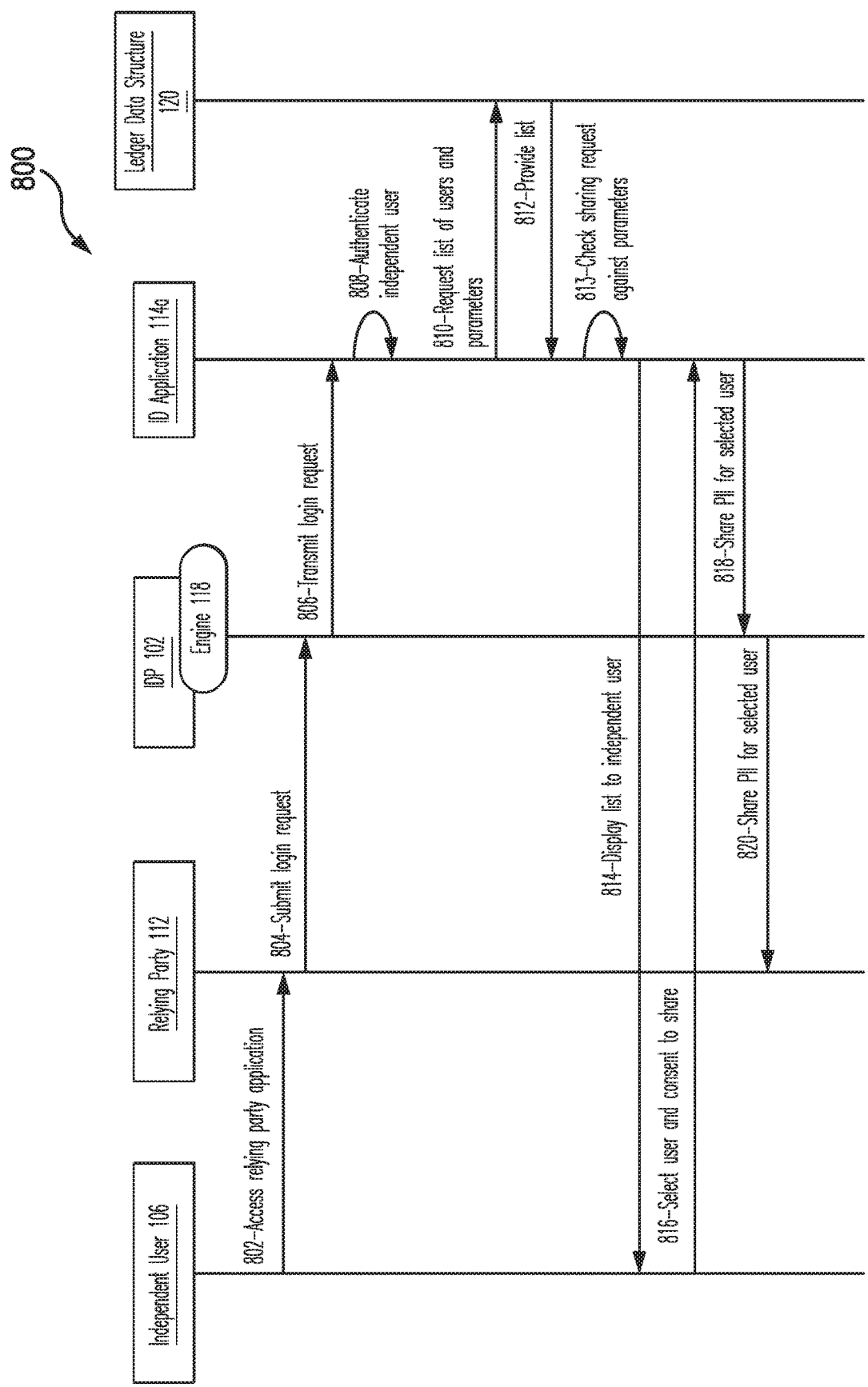

FIG. 7 illustrates an exemplary method, which may be implemented in connection with the system of FIG. 1, for assigning permission associated with an identity of an independent user, to a dependent user, based on a request by the independent user; and FIG. 8 illustrates an exemplary method, which may be implemented in connection with the system of FIG. 1, for sharing personal identifying information (PII) for a dependent user, by an independent user, with a relying party.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Users are often associated with identities, to which the users are authenticated in connection with various activities, such as, for example, requesting or directing services (e.g., ride share services, healthcare services, travel services, telecommunication services, etc.), establishing accounts (e.g., bank accounts, retirement accounts, email accounts, etc.), etc. In various instances, independent users may act on behalf of dependent users, whereby the activities are initiated for the benefit of the dependent users by the independent users. As such, the independent users may be required to provide personal identifying information (PII) and/or instructions on behalf of the dependent users to one or more relying parties, while also informing the relying parties of the independent users' authority with respect to the dependent users.

Uniquely, the systems and methods herein permit independent users to provide personal identifying information and/or instructions to relying parties on behalf of dependent users through an identification provider (IDP). In particular, an on-behalf-of (OBO) service (as provided herein) (or stand-in service) is called through the IDP, which permits dependent users to identify the approved and/or permissioned independent users allowed to act on behalf of the dependent users. Consequently, then, an independent user is permitted to act on behalf of a dependent user, consistent with a permission granted by the dependent user, in interacting with relying parties. In this manner, the independent user is permitted to stand-in for (and act on behalf of) the dependent user and coordinate activities for and on behalf of the dependent user, whereby the dependent user, after granting the permission, may be omitted from the interaction(s) with the relying party(ies). As such, efficiencies are gained in carrying out such activities with the relying party(ies) on behalf of the dependent user.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, relationships between users and relying parties, platforms for identity services, privacy concerns and/or requirements, etc.

The illustrated system 100 generally includes an identity provider (IDP) 102, a communication device 104 associated with an independent user 106, a communication device 108 associated with a dependent user 110, and a relying party 112, each of which is coupled to network 130. The network 130 may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Further, is various implementations, the network 130 may include multiple different networks, where one or more of the multiple different networks are then be accessible to particular ones of the IDP 102, communication devices 104 and 108, and/or the relying party 112.

The IDP 102 in the system 100 generally is associated with forming and/or managing digital identities associated with users (e.g., independent user 106, dependent user 110, etc.). In connection therewith, the IDP 102 is configured to participate in registering, provisioning, and storing (e.g., in secure memory (e.g., in a temporary lock box, etc.), etc.) identity information associated with the users which may be provided to one or more relying parties, as required (such as relying party 112). In connection with storing the identity information associated with the users, such information may be stored in a Trusted Execution Environment (TEE) associated with the IDP 102, or it may be stored locally at the communication devices 104 and 108 (e.g., in a secure element (SE) associated therewith, etc.). In general, then, when a digital identity is provided to the relying party 112, for a user, from the IDP 102, the relying party 112 is permitted to trust the digital identity, thereby relying on the authentication and provisioning processes of the IDP 102.

The communication devices 104 and 108 may each include, for example, a portable communication device such as a tablet, a smartphone, a personal computer, etc. Each of the communication devices 104 and 108 also includes one or more network-based applications, which permit access to the IDP 102 and/or the relying party 112 (via the communication devices 104 and 108). In this exemplary embodiment, each of the communication devices 104 and 108 includes an ID application (ID App) 114 provided by and/or associated with the IDP 102 and a relying party application (RP App) 116 associated with the relying party 112. In connection therewith, the ID application included in the communication device 104 is designated 114a, and the ID application included in the communication device 108 is designated 114b, while the relying party application included in the communication device 104 is designated 116a, and the relying party application included in the communication device 108 is designated 116b. The ID application 114 configures the communication devices 104 and 108 to interact with the IDP 102. It should be appreciated that the ID application 114 may be a standalone application for interacting with the IDP 102 or may be another application with one or more different purposes (e.g., part of a financial application, an email application, a social application, a telecommunication application, a health application, etc.), whereby a software development kit (SDK) provided by and/or associated with the IDP 102 is included to configure the communication devices 104 and 108 (as part of the ID application 114) to interact with the IDP 102. The relying party application 116 may further include a SDK provided by and/or associated with the relying party 112 and/or the IDP 102, which configures the communication devices 104 and 108, for example, to interact with the IDP 102, the relying party 112, and/or the ID application 114, as described below.

It should be appreciated that more or fewer applications may be included in other user communication devices in other embodiments. For example, multiple relying parties may be included in another system embodiment, whereby the relying party application 116 may accommodate the multiple relying parties or multiple different relying party applications may be included in the communication devices 104 and/or 108 (e.g., each having an SDK and/or otherwise adapted to interact with the IDP 102, etc.), etc.

In addition in the system 100, it should be appreciated that the independent user 106 is associated with an identity, and the dependent user 110 is associated with another different identity. For purposes of illustration, Table 1 below includes personal identifying information (PII) for the independent user 106 and for the dependent user 110 (e.g., as part of their identities, etc.). The PII included in Table 1 is merely exemplary in nature, as other different or other additional data may be included, and generally is, in the identities of the users 106 and 110.

TABLE 1

|  | Independent User 106 | Dependent User 110 |
|---|---|---|
| Name | Jane Smith | John Smith |
| Mailing Address | 123 Main St., New York, NY 10038 | 234 Main St., Long Island City, NY 11101 |
| Phone Number | 123-456-7890 | 098-765-4321 |
| Birthdate | Jan. 1, 1980 | Jan. 1, 2000 |
| Government ID # | 123456 | 654321 |

In general, the identities of the users 106 and 110 may include, without limitation, one or more of a name, a pseudonym, a mailing address, a billing address, a government ID number, an email address, a phone number, a birthdate, a place of birth, biometric references (e.g., facial images, etc.), gender, age, eye color, height, weight, hair color, account number(s), insurance identifier(s), an employee identifier, and/or other information sufficient to distinguish the users 106 and 110 from other users, etc. And, the identities of the users 106 and 110 may be evidenced by one or more physical documents issued by an authority (e.g., a federal government (e.g., a passport, a social security card, etc.), an insurance provider, a telecommunication provider (e.g., a mobile network operator (or MNO), etc.), a department of motor vehicles (or DMV), or other trusted identity authority, etc.).

In the system 110, a relationship of some type exists between the independent user 106 and the dependent user 110, whether legal, social, business, or otherwise. For example, the relationship between the independent user 106 and the dependent user 110 may be one of parent/child (or vice versa), employer/employee, business/interviewee, attorney/client, doctor/patient, or other suitable independent/dependent relationship, etc. Further, the relationship may be long term and/or permanent (e.g., brother/sister, etc.) or may be short term and/or temporary (e.g., business/interviewee, etc.).

The relying party 112 in the system 100 includes a company, a business or other entity through which services, accounts, etc. are offered to users, such as, for example, the dependent user 110, etc. In this exemplary embodiment, the relying party 112 provides and/or is associated with the relying party application 116 to interact with users related to services or other activities provided by the relying party 112. For example, the relying party 112 may include or provide a ride share service (whereby the relying party application 116 includes a ride-share application, etc.), which permits the user to order transportation from one location to another or multiple locations. Or, the relying party 112 may include a travel provider (e.g., whereby the relying party application 116 includes a travel application, etc.), which permits the user to book a flight or other transportation from one location to another, a hotel or other residence for a duration, a rental car, excursions, etc. In another example, the relying party 112 may include a provider of healthcare (e.g., a physician, a medical service provider (e.g., associated with dialysis, chemotherapy, etc.), hospice care, an emergency room, etc.), which permits users to make appointments, view and pay bills, view test results, communicate with providers, etc. (e.g., whereby the relying party application 116 includes a healthcare portal, etc.), etc. Moreover, it should generally be appreciated that the relying party 112 may be any entity which relies on the identity of a user to deliver any kind of access, services, etc., to the user.

That said, the relying party 112 is configured as a backend for the relying party application 116, whereby the relying party 112 is configured to interact with users through the relying party application 116. What's more, it should be appreciated that in some embodiments the relying party 112 may interact with the users through a website, which is hosted by the relying party 112 (or by an entity on behalf of the relying party 112) such that the relying party application 116 may then be considered a website hosted by a web browser application at the communication device 104 and/or the communication device 108, etc.

While only one IDP 102, two communication devices 104 and 108, two users 106 and 110, one relying party 112, one ID application 114, and one relying party application 116 are illustrated in the system 110, it should be appreciated that additional ones of these parts may be included in other system embodiments. Specifically, for example, it should be appreciated that other system embodiments will include multiple other independent and dependent users, each having various different relying party applications, etc.

Figure 2:
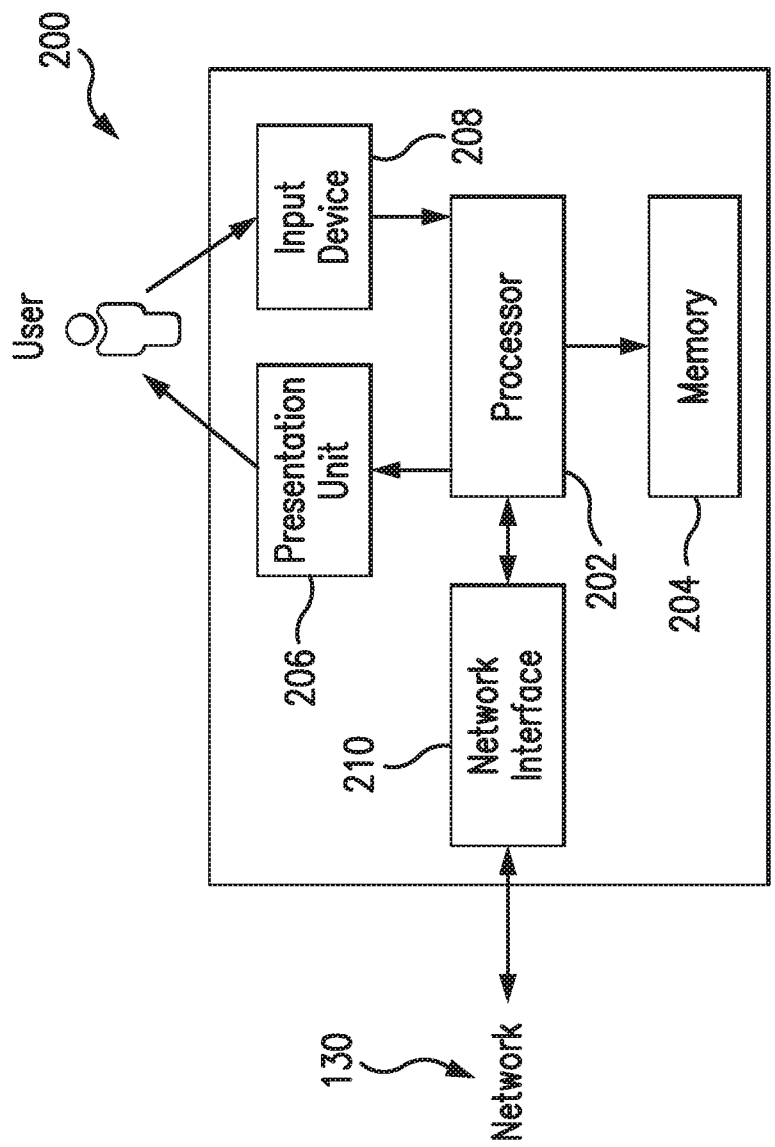
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the IDP 102, the communication device 104, the communication device 108, and the relying party 112 may be considered, may include, and/or may be implemented in a computing device consistent with the computing device 200, coupled to (and in communication with) the network 130. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity details and data related to identities of users, permissions, parameters, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of methods 300-800, etc.), whereby the computing device 200 may be transformed into a special purpose computing device. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., prompts to the users 106 and 110 at their respective communication devices 104 and 108 to accept a request for an independent-dependent relationship, etc.), etc. And, various interfaces (e.g., as defined by the applications 114 and 116, etc.) (e.g., forms to request or respond to a request for an independent-dependent relationship, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200 such as, for example, selections, submissions of requests, changes to parameters, acceptance/denial of requests, etc., in response to prompts from one or more interfaces, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different networks herein (e.g., network 130, etc.) and/or with other devices described herein. Further, in some exemplary embodiments, the computing device 200 may include the processor 202 and one or more network interfaces incorporated into or with the processor 202.

Referring again to FIG. 1, the IDP 102 includes an on-behalf-of (OBO) engine 118 and a ledger data structure 120. In this exemplary embodiment, the engine 118 includes executable instructions, which when executed by a computing device that is part of the IDP 102 (e.g., a computing device 200 included therein, etc.) causes the computing device to operate as described herein. The ledger data structure 120 may be a standalone computing device, or may be integrated with the engine 118, in a computing device which is part of the IDP 102. In at least one embodiment, the engine 118 and ledger data structure 120 are separate from the IDP 102, and are included in a computing device, whereby the engine 118 configures the computing device to communicate with the IDP 102, for example, through one or more APIs, etc.

The independent user 106 and the dependent user 110 are each associated with an identity, as explained above. In addition, each of the users 106 and 110 is associated with a digital identity representative of their respective identity, and which is stored in the respective communication devices 104 and 108 (with the communication device 104 storing data relating to the identity of the user 106 in a secure element in memory 204 therein, and with the communication device 108 storing data relating to the identity of the user 110 in a secure element in memory 204 therein). Alternatively, in some embodiments, such identity data may be stored in the IDP 102. In any case, the digital identity, as stored, is inclusive of the data included in Table 1 and/or other PII specific to each of the particular users 106 and 110. In connection therewith, then, the engine 118 is configured to cause the IDP 102 to permit the independent user 106 or the dependent user 110 to request that the dependent user 110 be defined as a dependent user 110 for the independent user 106, whereby the independent user 106 is permitted to act on behalf of the dependent user 110 with the relying party 112, with respect to the identity of the dependent user 110.

Specifically, in one aspect, the engine 118 (e.g., as used herein, a computing device configured by the engine 118; etc.) is configured to receive an on-behalf-of (OBO) request from the dependent user 110 for the independent user 106 (i.e., to grant permission to the independent user 106 to act on behalf of (or stand-in for) the dependent user 110), for example, via the ID App 114a at the communication device 104. In response, the engine 118 is configured to confirm user ID information for the users 106 and 110 as included in the OBO request and also to confirm that the independent user 106 accepts (or has accepted) the OBO request. The engine 118 then is configured to add (or link) the OBO permission given to the independent user 106 for the dependent user 110 to the ledger data structure 120 for later use by the independent user 106. Alternatively, or additionally, the engine 118 may receive an OBO request from the independent user 106 for the dependent user 110 (i.e., to grant permission to the independent user 106 to act on behalf of the dependent user 110), for example, via the ID App 114b at the communication device 108. In response, the engine 118 again is configured to confirm user ID information for the users 106 and 110 as included in the OBO request and also confirms that the dependent user 110 accepts (or has accepted) the OBO request and/or the parameters of the permission defined by the OBO request. Like above, the engine 118 then is configured to add the OBO permission given to the independent user 106 for the dependent user 110 to the ledger data structure 120 for later use by the independent user 106. With that said, it should be appreciated that the OBO permissions relate only to the permissions granted to the independent user 106 by the dependent user 110, whereby the independent user 106 has permission to act on behalf of the dependent user 110. The dependent user 110 is not similarly granted permission to act on behalf of the independent user 106 (e.g., the OBO permissions are not dual direction permissions, etc.).

Thereafter, the independent user 106 may interact with the relying party 112, on behalf of the dependent user 110. In particular, the independent user 106 accesses the relying party application 116a at his/her communication device 104, and the communication device 104, as configured by the relying party application 116a, initiates a login of the independent user 106 via the IDP 102. In response, the IDP 102 is configured to interact with the ID application 114a at the communication device 104. The communication device 104, as configured by the ID application 114a, in turn, authenticates the independent user 106 and requests permission (from the independent user 106) to share the OBO permission given to the independent user 106 for the dependent user 110 with the relying party 112. When granted, the communication device 104, as configured by the ID application 114a, transmits the consent to the IDP 102, which is configured to then share the OBO permission with the relying party 112. In connection therewith, the IDP 102 may confirm any parameters set by the dependent user 110 (e.g., limits set by the dependent user 110 as to what information is actually available for sharing by the independent user 106, etc.) and/or by the independent user 106 (e.g., geographic parameters, cost parameters, etc. set by the independent user 106 for the dependent user 110; etc.) with regard to the OBO permission prior to sharing the OBO permission with the relying party 112 (e.g., upon receiving the login request from the independent user 106, sometime thereafter, etc.). The relying party 112 is then informed of the OBO permission, and may then permit the independent user 106 to stand in or act on behalf of the dependent user 110 in dealing with the relying party 112.

While the above is described with reference to the IDP 102, it should be appreciated that the engine 118 may stand in for the IDP 102 in the above operations. It should also be appreciated that, in connection with and/or after the OBO permission given to the independent user 106 for the dependent user 110 is shared with the relying party 112, the IDP 102 (and/or the engine 118) may, from time to time, provide an update (e.g., as part of a bulk update for multiple independent users and dependent users, etc.) to the relying party 112, providing OBO permission and/or any changes in the OBO permission given to the independent user 106 for the dependent user 110.

In another aspect, the engine 118 may receive an OBO request from the dependent user 110 (i.e., to provision PII for the dependent user 110 (e.g., as shown in Table 1, etc.) to the communication device 104 of the independent user 106 for use by the independent user 106 on behalf of the dependent user 110) (e.g., via the relying party application 116b, etc.). In response, the engine 118 is configured to transmit the PII (as included in the request from the dependent user 110) to secure memory at the IDP 102 (e.g., a secure data structure in memory 204 of the IDP 102 (e.g., a temporary lock box, etc.), etc.), and then authenticates the independent user 106 and confirms the OBO request with the independent user 106, at the communication device 104, via the ID application 114a. Once confirmed, the engine 118 is configured to retrieve the PII for the dependent user 110 from the secure memory at the IDP 102 and transmit the PII to the independent user 106 at the communication device 104, and specifically, at the ID application 114*a*, which configures the communication device 104 to store the PII in memory therein (e.g., in a secure element of the memory, etc.). In connection therewith, the IDP 102 and/or the engine 118 may confirm any parameters set by the dependent user 110 and/or by the independent user 106 with regard to the OBO request (and the related PII of the dependent user 110) prior to sharing the PII with the independent user 110 (e.g., upon receiving the PII from the dependent user 106 and engine 118, sometime thereafter, etc.). What's more, the engine 118 is configured to transmit the OBO permission for the independent user 106 to use the PII on behalf of the dependent user 110 to the ledger data structure 120, which is configured to store the permission data in memory (e.g., as part of a list of permissions given to the independent user 106 by the dependent user 110, as part of a list of parameters associated with any permissions given to the independent user 106 by the dependent user 110, combinations thereof, etc.). In general, the permission data stored in the ledger data structure 120 may include an indication of and/or may be associated with the PII of the dependent user 110 but may not include the actual PII. The permission data may simply relate to the independent user's ability to take certain actions on behalf of the dependent user 110.

Alternatively in this aspect, or additionally, the engine 118 may receive an OBO request from the independent user 106 (i.e., to provision PII for the dependent user 110 to the communication device 104 of the independent user 106 for use by the independent user 106 on behalf of the dependent user 110). In response, the engine 118 is configured to authenticate the dependent user 110 at the communication device 108 and confirms the OBO request with the dependent user 110 again at the communication device 108, via the ID application 114*b*. In turn, the engine 118 is configured to receive PII from the dependent user 110 as part of the confirmation and transmits the PII (included in the OBO request) to the secure memory at the IDP 102. Next, the engine 118 is configured to authenticate the independent user 106, at the communication device 104, via the ID application 114*a*, and retrieves the PII for the dependent user 110 from the secure memory at the IDP 102. The engine 118, then, is configured to transmit the PII to the independent user 106 at the communication device 104, and specifically, at the ID application 114*a*, which configures the communication device 104 to store the PII in memory (e.g., in a secure element in memory 204 of the communication device 104, etc.). Again, the IDP 102 and/or the engine 118 may confirm any parameters set by the dependent user 110 and/or by the independent user 106 with regard to the OBO request (and the related PII of the dependent user 110) prior to sharing the PII with the independent user 110 (e.g., upon receiving the PII from the dependent user 106 and engine 118, sometime thereafter, etc.). What's more, the engine 118 is configured to transmit the permission for the independent user 106 to use the PII on behalf of the dependent user 110 to the ledger data structure 120, which is configured to store the permission data in memory.

Thereafter, in connection with sharing the PII with the relying party 112, the independent user 106 access the relying party application 116*a* at the communication device 104. In turn, the relying party application 116*a* configures the communication device 104 to submit a login request to the IDP 102 (e.g., via the engine 118, etc.). In response, the IDP 102 is configured to transmit a login request (or identity request) to the independent user 106, at the ID application 114*a* of the communication device 104, whereby the independent user 106 is authenticated. Then, the communication device 104, as configured by the ID application 114*a*, requests a list of users with permission assigned to the independent user 106 from the ledger data structure 120 (e.g., directly or via the engine 118, etc.). The ledger data structure 120 is configured to respond with a list of the users with permission assigned to the independent user 106. The communication device 104, as configured by the ID application 114*a*, displays the list to the independent user 106, which in turn selects the dependent user 110, for example. In response, the communication device 104, as configured by the ID application 114*a*, shares the PII of the dependent user 110 with the IDP 102, which in turn, is configured to share the PII of the dependent user 110 with the relying party 112. The relying party 112 is then configured to proceed with one or more activities for the dependent user 110 based on the PII received. And, again, the IDP 102 may confirm any parameters set by the dependent user 110 and/or by the independent user 106 with regard to the PII of the dependent user 110 prior to sharing the PII with the relying party 112 (e.g., upon receiving the PII from the independent user 110, sometime there before or thereafter, etc.).

Figure 3:
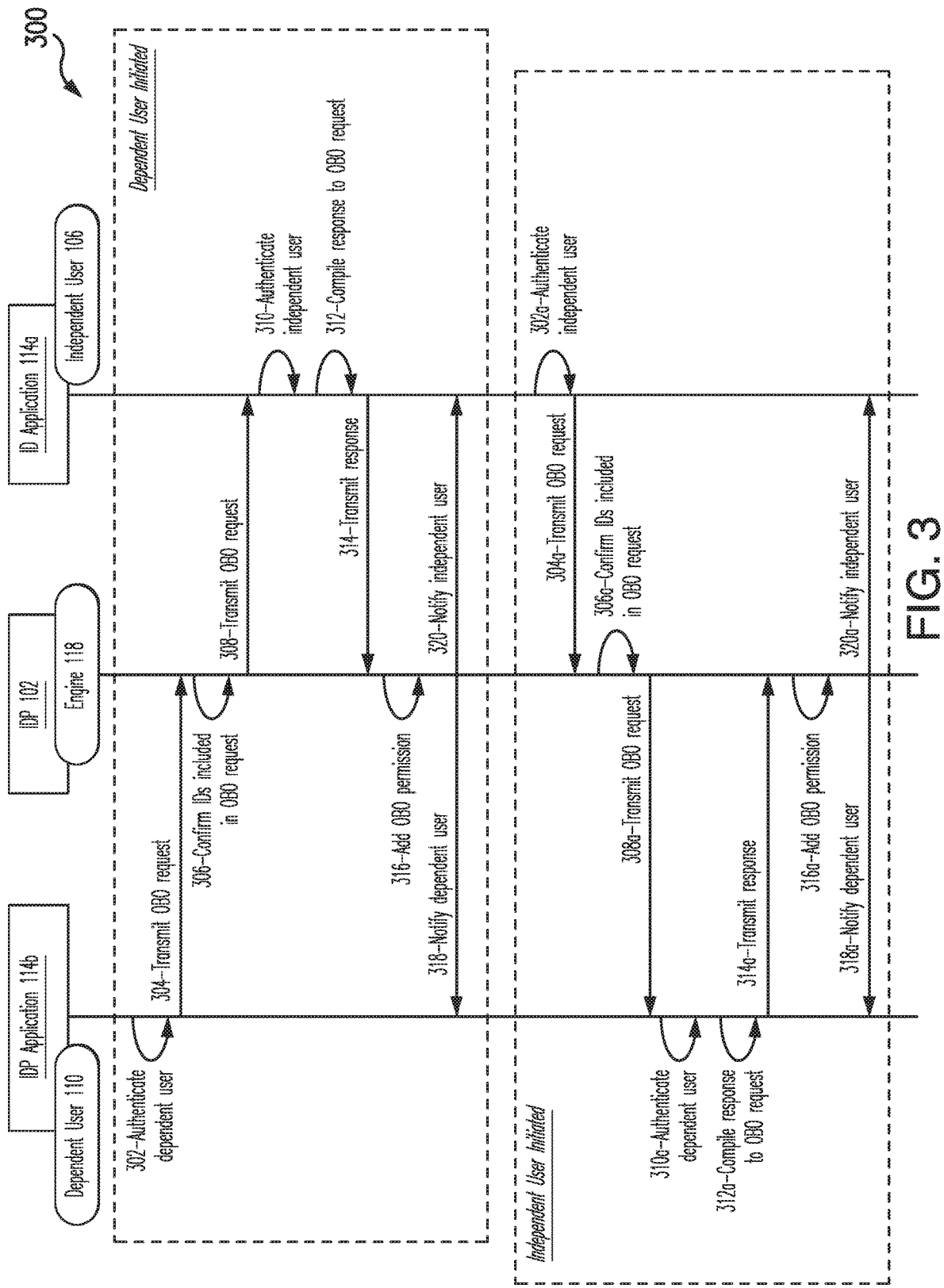
FIG. 3 illustrates an exemplary method, which may be implemented in connection with the system of FIG. 1, for assigning permission associated with the identity of a dependent user to an independent user.

FIG. 3 illustrates an exemplary method 300 for use in assigning permission associated with the identity of a dependent user. The exemplary method 300 is described as implemented in system 110, with reference to the IDP 102, the engine 118, and the ID application 114, and with additional reference to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

Initially in the method 300, it should be appreciated that assigning the permission associated with the identity of the dependent user 110 to the independent user 106, for example, may be initiated by the dependent user 110 or by the independent user 106 to which the permission is granted. FIG. 3 illustrates one flow, as defined by the dotted box designated "Dependent User Initiated" to indicate the scenario where the assignment of permission is initiated by the dependent user 110. And, FIG. 3 then illustrates another flow, as defined by the dotted box designated "Independent User Initiated" to indicate the scenario where the assignment of permission is initiated by the independent user 106.

As shown in FIG. 3, when the dependent user 110 initiates the assignment of a permission, the ID application 114*b* authenticates the dependent user 110, at 302. The authentication may be local at the communication device 108 based on data (e.g., biometric data, a password, and/or a passcode, etc.) stored locally in the communication device 108 (e.g., in memory 204, in a secure element (SE) of memory 204 or not, etc.) or accessed remotely by the communication device 108, or potentially, the authentication may be based on one or more interactions with the IDP 102. Additionally, it should be appreciated that the authentication may be specific to the ID application 114*b* or the authentication may be performed by the communication device 108, for example, as a protection to even access the communication device 108 and/or the ID application 114*b* (e.g., based on a passcode, biometric (e.g., facial recognition, fingerprint, etc.), etc.).

When authenticated, the ID application 114*b* transmits, at 304, an OBO request to the IDP 102, and specifically, to the engine 118 of the IDP 102. The OBO request includes an ID for the dependent user 110, an ID for the independent user 106 to which the permission is to be granted, and one or more parameters associated with the permission. The ID's often include a unique number (e.g., a phone number, a government ID number, an ID application specific number, etc.). And, the parameters may include, generally, a definition of what PII may be disseminated by the independent user 106 and to whom it may be disseminated. For example, the parameters may include a type of PII (e.g., general (name, address, phone number, birthdate, etc.), confidential (e.g., social security number, mother's maiden name, payment account credentials, etc.), etc.), duration of the permission, geographic boundaries of the permission, relying party categories for use of the permission (e.g., by merchant category code (MCC), etc.), types activities associated with the permission (e.g., making reservations, making payments, opening accounts, etc.), and other suitable limits and/or definitions of permissions, etc.

Upon receipt of the OBO request, the engine 118 confirms, at 306, the user ID's (e.g., confirms that the dependent user ID is associated with the communication device 108, from which the OBO request was received; etc.). When confirmed, the engine 118 transmits the OBO request, at 308, to the ID application 114a of the independent user 106, at the communication device 104. In response the ID application 114a authenticates the independent user 106, at 310 (e.g., via a password, a passcode, a biometric, etc.), locally at the communication device 104, or otherwise, as described above, etc.

After authentication, or in connection therewith, the ID application 114a displays the OBO request, or a portion thereof, to the independent user 106 to solicit a response. In response, the independent user 106 provides one or more inputs to the ID application 114a indicating an acceptance of the permission and, potentially, alterations to the parameters, etc. For example, the independent user 106 may accept a permission to general PII, but not to confidential PII. That is, the independent user 106 may provide an input to reduce a permission, but, generally, will not be able to expand the permission in this exemplary embodiment (but may be permitted to do so in other embodiments). In response, the ID application 114a compiles, at 312, a response to the OBO request and transmits, at 314, the response to the IDP 102, and specifically, the engine 118.

Based on the response, the engine 118 adds, at 316, the permission to the ledger data structure 120 (e.g., links, to the independent user 106, the OBO permission given to the independent user 106 for the dependent user 110; etc.) for later use in connection with the independent user 106 (e.g., in connection with a desired interaction of the dependent user 110 with the relying party 112, etc.). A notification confirming the permission is then transmitted, by the engine 118, to the dependent user 110, at 318, at the ID application 114b of the communication device 108. And, a similar notification is transmitted, by the engine 118, to the independent user 106, at 320, at the ID application 114a of the communication device 104.

Conversely in the method 300, when the independent user 106 initiates the assignment of a permission, the ID application 114a authenticates the independent user 106, at 302a. As above, the authentication may be local at the communication device 104 based on data (e.g., biometric data, a password, and/or a passcode, etc.) stored in the communication device 104 or stored remote from the communication device 104, or potentially, the authentication may be based on one or more interactions with the IDP 102. And, again, it should be appreciated that the authentication may be specific to the ID application 114a or it may be performed by the communication device 104, for example, as a protection to even access the communication device 104 and/or the ID application 114a (e.g., via a passcode, biometric (e.g., facial recognition, fingerprint, etc.), etc.).

When authenticated, the ID application 114a transmits, at 304a, an OBO request to the IDP 102, and specifically, to the engine 118 of the IDP 102. The OBO request again includes an ID for the dependent user 110, an ID for the independent user 106 to which the permission is to be granted, and one or more parameters associated with the permission. Upon receipt of the OBO request, the engine 118 confirms, at 306a, the user ID's for the users 106 and 110 (e.g., confirms the ID of the independent user 106 is associated with the communication device 104, from which the OBO request was received, etc.). When confirmed, the engine 118 transmits the OBO request, at 308a, to the ID application 114b of the dependent user 110 at the communication device 108. In response, the ID application 114b authenticates the dependent user 110, at 310a (e.g., via a password, a passcode, a biometric, etc.), locally at the communication device 108, or otherwise, as described above, etc. And, after authentication, or in connection therewith, the ID application 114b displays the OBO request, or a portion thereof, to the dependent user 110 to solicit a response. In turn, the dependent user 110 provides one or more inputs to the ID application 114b, at the communication device 108, indicating an acceptance of the permission and, potentially, changing and/or altering the parameters of the permission, etc. The ID application 114b, then, compiles, at 312a, a response to the OBO request and transmits, at 314a, the response to the IDP 102, and specifically, to the engine 118.

Based on the response, the engine 118 adds, at 316a, the permission to the ledger data structure 120 for later use in connection with the independent user 106 (e.g., in connection with a desired interaction of the dependent user 110 with the relying party 112, etc.). A notification confirming the permission is then transmitted, again, by the engine 118, to the dependent user 110, at 318a, at the ID application 114b of the communication device 108. And, a similar notification is transmitted, by the engine 118, to the independent user 106, at 320a, at the ID application 114a of the communication device 104.

Figure 4:
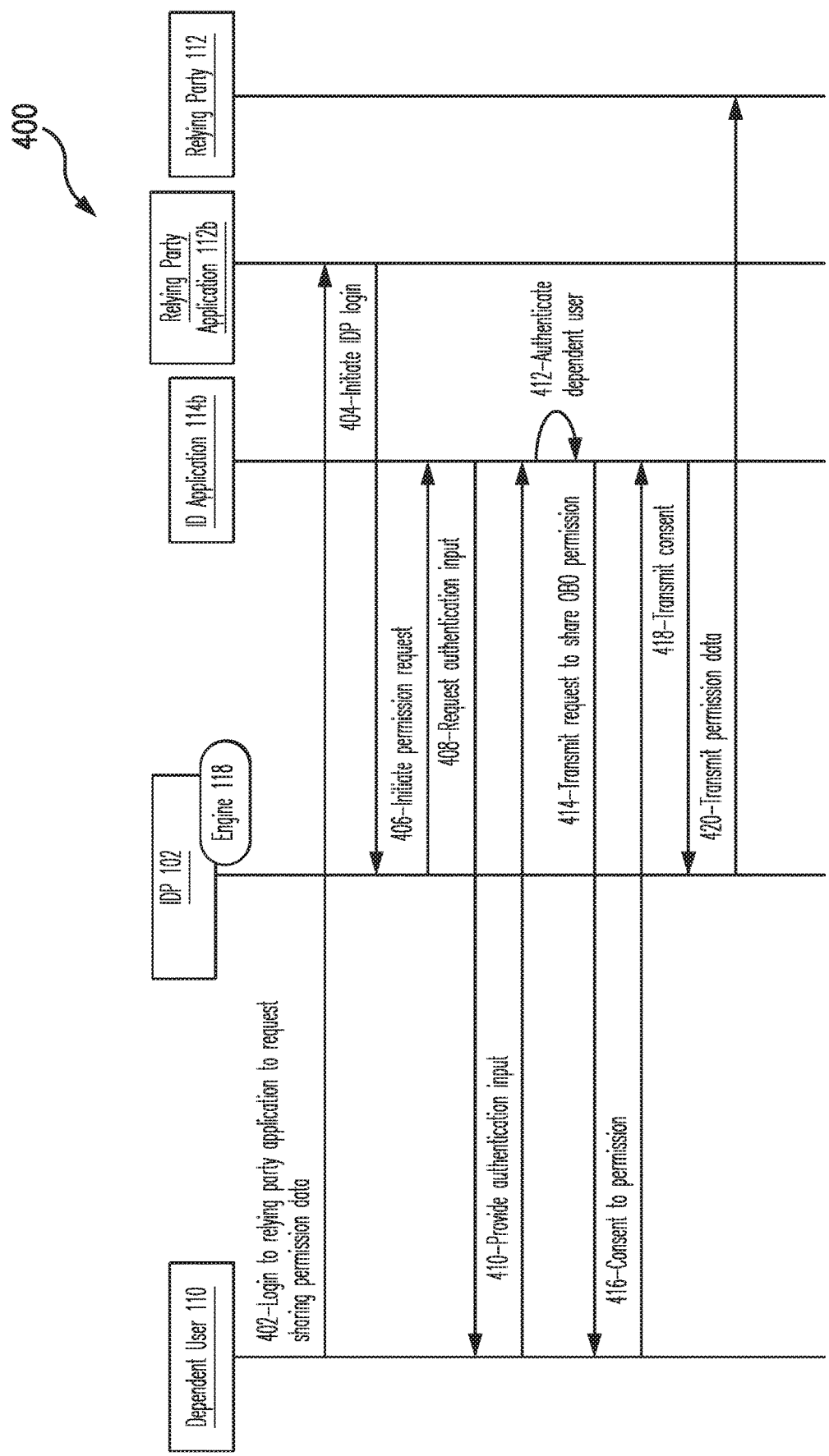
FIG. 4 illustrates an exemplary method, which may be implemented in connection with the system of FIG. 1, for sharing permission data with a relying party.

FIG. 4 illustrates an exemplary method 400 for use in sharing permission data, associated with a dependent user, with a relying party. The exemplary method 400 is described as implemented in the system 110, with reference to the IDP 102, the ID application 114b at the communication device 108 of the dependent user 110, the relying party application 116b at the communication device 108 of the dependent user 110, and the relying party 112, and also with reference to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 400.

At the outset in the method 400, the dependent user 110 opens the relying party application 116b, at his/her communication device 108, and logs in, at 402, to initiate a request for sharing of his/her permission data specifically with the relying party 112 (e.g., in connection with a desired interaction with the relying party 112, etc.). The login, by the dependent user 110, includes a dependent user ID, or other suitable credential, to identify the dependent user 110. In response, the relying party application 116b launches an SDK included therein (and provided by the IDP 102) and initiates, at 404, login with the IDP 102. In connection therewith, the dependent user ID and an identifier associated with the relying party 112 are provided to the IDP 102.

In response, the IDP 102 initiates a permission request to the ID application 114b, at 406. Upon receipt, the ID application 114b proceeds to authenticate the dependent user 110. Specifically, the ID application 114b requests an authentication input from the dependent user 110, at 408. The authentication input may include, as described above, a biometric, a passcode, a password or other suitable input, etc. In at least one embodiment, the request for the authentication input is a challenge question related to PII of the dependent user 110 (e.g., a request for the last four digital of a government ID number, or for a mother's maiden name, etc.). The dependent user 110 then provides, at 410, the authentication input to the ID application 114b. And, the ID application 114b then authenticates, at 412, the dependent user 110. This may be accomplished by comparing the authentication input to a reference stored in a memory of the communication device 108 (e.g., the memory 204, or a secure element therein, etc.) or to a reference stored remotely through one or more interactions with the IDP 102, etc.

Once authenticated, the ID application 114b shares, at 414, the OBO permission request (or part thereof) with the dependent user 110. This may be accomplished by displaying the permission request to the dependent user 110, or by otherwise. In response, the dependent user 110 consents to the permission data being shared with the relying party 112 as defined in the permission request, at 416 (or potentially, denies consent to the permission data being shared or to a portion of the permission data to be shared (e.g., whereby the dependent user 110 may select the particular data to be shared as part of the consent, etc.)). When consent is provided back, the ID application 114b transmits, at 418, the consent of the dependent user 110 to the IDP 102. Upon receipt of the consent, the IDP 102 may check the ledger data structure 120 and verify that OBO permission has been granted by the dependent user 110 to the independent user 106 (e.g., as described above for the method 300, etc.). In so doing, the IDP 102 may also confirm any parameters set by the dependent user 110 and/or set by the independent user 106 with regard to the OBO permission. Once verified, the IDP 102 then provides, at 420, the appropriate permission data to the replying party 112, either directly or through the relying party application 116b (whereby the relying party application 116b then provides the same to the relying party 112) (e.g., upon verifying that OBO permission has previously been granted by the dependent user 110 to the independent user 106 (e.g., as described above for the method 300, etc.), etc.).

The permission data provided to the relying party 112 may include the ID of the dependent user 110, an ID of the independent user 106, and one or more parameters associated with the permission, etc., whereby the relying party 112 is then permitted, for example, to interact with the identified independent user 106 on the behalf of the deponent user 110, to retrieve PII for the dependent user 110 based on actual interaction with the independent user 108, etc., subject to the given permission. It should be noted that the user ID's may be as used and/or known within the IDP 102 or may be tokenized, by the IDP 102 (and tokenized differently for different relying parties), for added security, etc. What's more, in some embodiments, the permission data may further include (or may be accompanied by) PII for the dependent user 110, such that the relying party 112 is permitted to use the PII at the direction of the dependent user 110 or the independent user 106, subject to the permission (whereby the relying party 112 is not required to later retrieve the PII from the IDP 102), etc.

Figure 5:
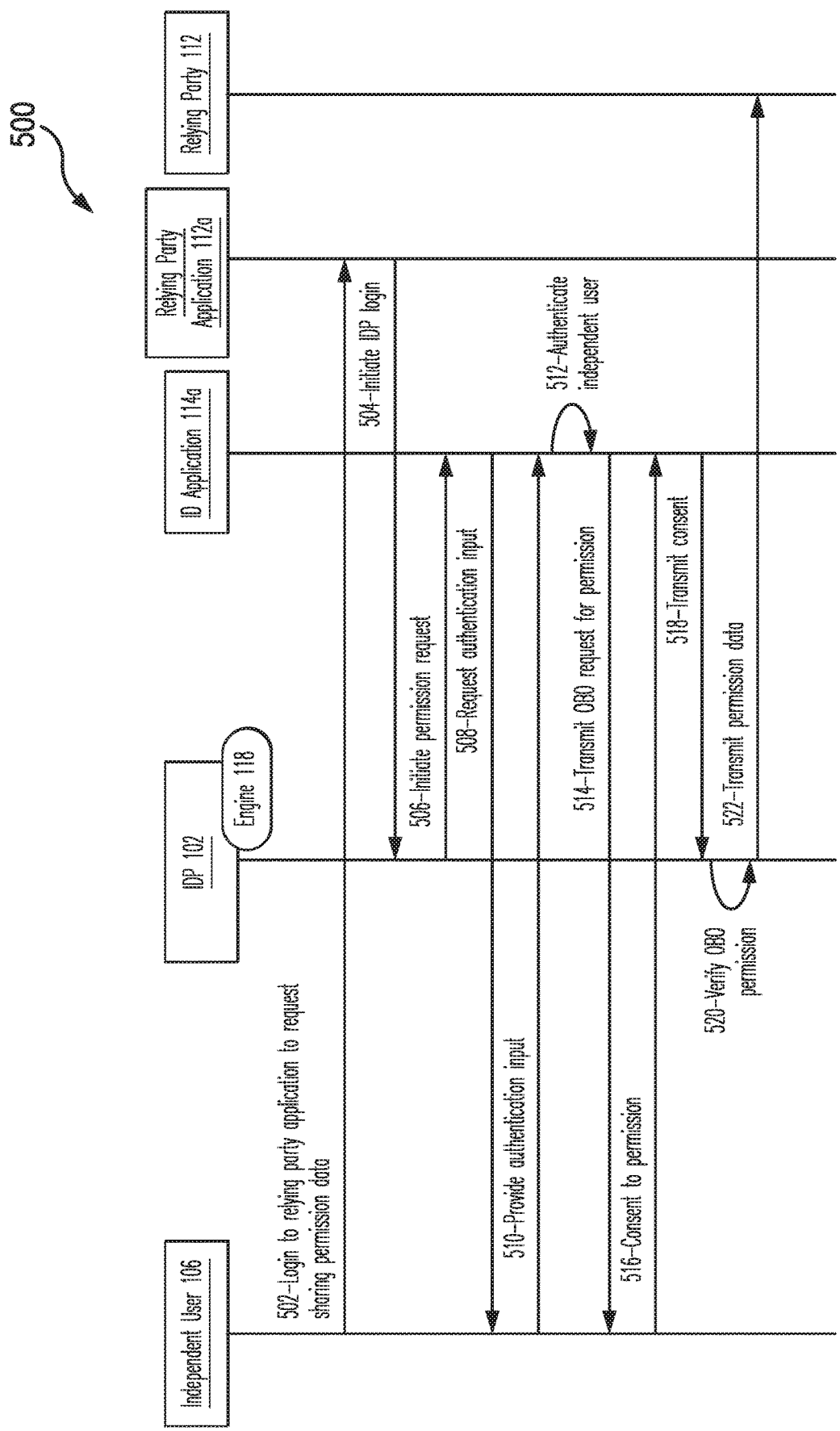
FIG. 5 illustrates another exemplary method, which may be implemented in connection with the system of FIG. 1, for sharing permission data with a relying party.

In FIG. 4, the permission data is extended to the relying party 112 (e.g., via the independent user 106, etc.) upon initiation of the sharing request by the dependent user 110. Conversely, FIG. 5 illustrates an exemplary method 500 for use in sharing permission data associated with the dependent user 110 with the relying party 112, upon initiation of a sharing request by the independent user 106. The exemplary method 500 is described as implemented in the system 110, with reference to the IDP 102, the ID application 114a at the communication device 104 of the independent user 106, the relying party application 116a at the communication device 104 of the independent user 106, and the relying party 112, and also with reference to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 500.

At the outset in the method 500, the independent user 106 opens the relying party application 116a, at his/her communication device 104, and logs in, at 502, to initiate a request for sharing permission data for the dependent user 110 with the relying party 112. The login, by the independent user 106, includes an ID for the independent user 106, or other suitable credential to identify the independent user 106. In response, the relying party application 116a launches an SDK included therein (and provided by the IDP 102) and initiates, at 504, login with the IDP 102. In connection therewith, the independent user ID, an ID of the dependent user 110, and an identifier associated with the relying party 112 is provided to the IDP 102.

In response, the IDP 102 initiates a permission request to the ID application 114a, at 506. Upon receipt, the ID application 114a proceeds to authenticate the independent user 106. Specifically, the ID application 114b request an authentication input from the independent user 106, at 508. The authentication input may include, as described above, a biometric, a passcode, a password or other suitable input, etc. In at least one embodiment, the request for the authentication input is a challenge question related to PII of the independent user 106 (e.g., a request for the last four digital of a government ID number, or for a mother's maiden name, etc.). The independent user 106 then provides, at 510, the authentication input to the ID application 114a. The ID application 114a then authenticates, at 512, the independent user 106. This may be accomplished by comparing the authentication input to a reference stored in a memory of the communication device 104 (e.g., the memory 204, or a secure element, etc.) or to a reference stored remotely through one or more interactions with the IDP 102, etc.

Once authenticated, the ID application 114a shares, at 514, the OBO permission request (or part thereof) with the independent user 106. This may be accomplished by displaying the permission request to the independent user 106 at the communication device 104 or otherwise communicating the request to the user 106. In response, the independent user 106 consents to the permission data being shared with the relying party 112 as defined in the permission request, at 516 (or potentially, denies consent to the permission data being shared). When consent is provided, the ID application 114a transmits, at 518, the consent of the independent user 106 to the IDP 102.

Upon receipt of the consent, the IDP 102 checks the ledger data structure 120 and verifies, at 520, that OBO permission has previously been granted by the dependent user 110 to the independent user 106 (e.g., as described above for the method 300, etc.). In so doing, the IDP 102 may also confirm any parameters set by the dependent user 110 and/or set by the independent user 106 with regard to the OBO permission. Once verified, the IDP 102 then provides, at 522, the permission data to the replying party 112, either directly or through the relying party application 116*b* (whereby the relying party application 116*b* provides the same to the relying party 112).

The permission data provided to the relying party 112 may include the ID of the dependent user 110, the ID of the independent user 106, and one or more parameters associated with the permission, etc., whereby the relying party 112 is permitted, for example, to interact with the identified independent user 106 on the behalf of the deponent user 110, to retrieve PII for the dependent user 110 based on interaction with the independent user 108, to receive PII for the dependent user 110 from the independent user 106, etc., subject to the permission. It should be noted that the user ID's may be as used and/or known within the IDP 102 or may be tokenized, by the IDP 102 (and tokenized differently for different relying parties), for added security, etc. What's more, in some embodiments, the permission data may further include (or may be accompanied by) PII for the independent user 106 and/or the dependent user 110, such that the relying party 112 is permitted to use the PII at the direction of the independent user 106, subject to the permission (whereby the relying party 112 is not required to later retrieve the PII from the IDP 102), etc.

Figure 6:
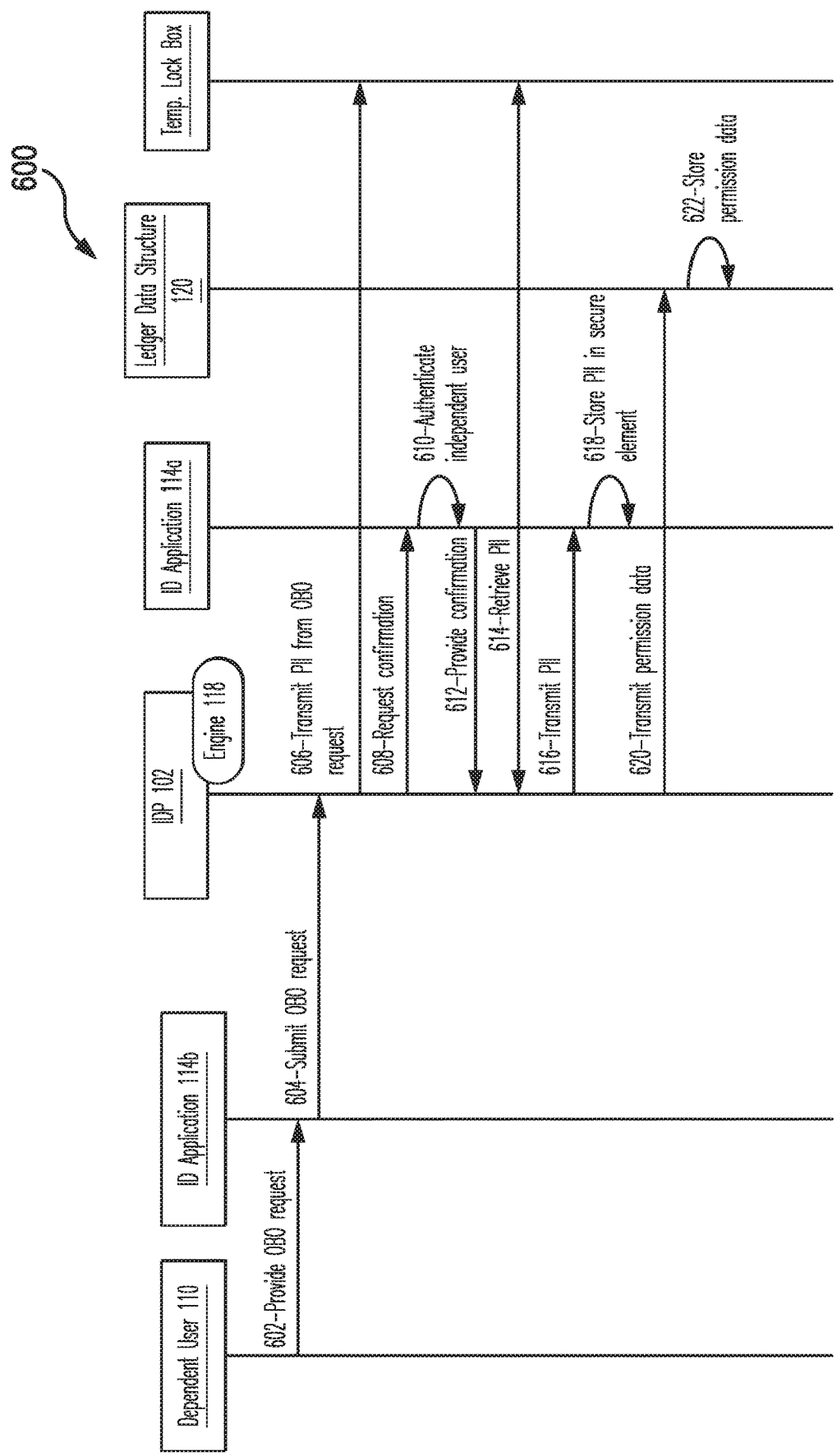
FIG. 6 illustrates an exemplary method, which may be implemented in connection with the system of FIG. 1, for assigning permission associated with an identity of a dependent user, to an independent user, based on a dependent user request.

FIG. 6 illustrates an exemplary method 600 for use in assigning permission associated with an identity of a dependent user, based on a request by the dependent user. The exemplary method 600 is described as implemented in the system 110, with reference to the IDP 102, the engine 118, the ID application 114*a* at the communication device 104 of the independent user 106, and the ID application 114*b* at the communication device 108 of the dependent user 110, and also with reference to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 600.

Initially in method 600, the dependent user 110 provides an OBO request, at 602, to the ID application 114*b* on his/her communication device 108. The OBO request is then submitted, at 604, by the ID application 114*b*, to the IDP 102, and specifically, to the engine 118. It should be appreciated that the OBO request may include an ID for the dependent user 110 and an ID for the independent user 106 which is the user to which the dependent user 110 intends to assign permission. The OBO request may further include a grant of permission (e.g., as defined by one or more parameters, etc.) and PII (i.e., a shared credential) associated with the dependent user 110 and intended to be shared. The PII may include, without limitation, one or more of a name of the user 110, a mailing address, a government ID number, an email address, a phone number, a birthdate, or otherwise (e.g., as described herein, etc.).

Upon receipt, the engine 118 transmits, at 606, the PII from the OBO request to a temporary lock box (e.g., upon verifying that OBO permission has previously been granted by the dependent user 110 to the independent user 106 (e.g., as described above for the method 300, etc.), etc.). The temporary lock box may include a secure data structure in memory of the IDP 102, or otherwise, where the PII may be encrypted and securely stored temporarily (such that the temporary lock box may not be permanent storage). Additionally, the engine 118 requests, at 608, confirmation of the permission grant from the independent user 106, at the communication device 104, and specially, at the ID application 114*a* thereon. In response, the ID application 114*a* authenticates, at 610, the independent user 106, as described herein, and then solicits, in connection therewith or separately, confirmation of the assignment of the permission to the independent user 106. The solicitation may include the dependent user ID or other detail associated with the dependent user 110 and a description (or summary) of the permission to be assigned.

The independent user 106, if desired, provides confirmation, at 612, to the OBO request and/or to the permission associated therewith, to the engine 118. In doing so, the independent user 106 further grants, in this exemplary embodiment, permission for the PII of the dependent user 110 to be stored in the independent user's communication device 104.

In response, the engine 118 retrieves, at 614, the PII from the temporary lock box. The retrieval may include, for example, providing a request to the temporary lock box, which includes an identification of the dependent user 110 and/or the PII previously provided. The temporary lock box, in turn, retrieves the identified PII and transmits the same to the IDP 102. In this manner, the engine 118, or more generally, the IDP 102, does not hold the PII for the dependent user 110. Thereafter, the engine 118 transmits, at 416, the PII to the independent user 110 at the ID application 114*a*, whereupon the PII is stored, at 618, in memory of the communication device 104 (e.g., in a secure element, etc.).

In addition, the engine 118 further transmits permission data associated with the granted permission for the independent user 106 to act on behalf of the dependent user 110, along with the PII, to the ledger data structure 120, at 620. And, as above, at 622, the ledger data structure 120 stores the permission data therein (e.g., linking, to the independent user 106, the permission given to the independent user 106 for the dependent user 110 and/or the corresponding permission data and PII; etc.).

FIG. 7 illustrates an exemplary method 700 for use in assigning permission associated with an identity of a dependent user, based on a request by an independent. The exemplary method 700 is described as implemented in the system 110, with reference to the IDP 102, the engine 118, the ID application 114*a* at the communication device 104 of the independent user 106, and the ID application 114*b* at the communication device 108 of the dependent user 110, and also with reference to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 700.

At the outset in method 700, the independent user 106 provides an OBO request, at 702, to the ID application 114*a* on his/her communication device 104. The OBO request is then submitted, at 704, by the ID application 114*a*, to the IDP 102 and specifically, to the engine 118. The OBO request may include, for example, an ID for the dependent user 110, an ID for the independent user 106 which is the user to which the dependent user 110 intends to assign permission, and a grant of permission (e.g., as defined by one or more parameters). As above, the user ID's may include identifiers for the users 106 and 110 specific to the IDP 102, or potentially, phone numbers or email addresses specific to the independent user 106 or the dependent user 110.

Upon receipt, the engine 118 transmits, at 706, a request for permission to the dependent user 110, at the ID application 114*b* of his/her communication device 108. The request includes, for example, the independent user ID and the grant of permission as requested by the independent user 106, etc. In response, the ID application 114*b* authenticates, at 708, the dependent user 110, as described herein. The ID application 114*b*, in connection with the authentication, or separately, solicits a confirmation of the permission grant from the dependent user 110. In turn, the dependent user 110 confirms the grant of permission, or not, and further, when granted, provides, enters or selects PII, at the ID application 114*b*, to be the subject of the grant of permission. As above, the PII may include, without limitation, one or more of a name of the user 110, a mailing address, a government ID number, an email address, a phone number, a birthdate, or otherwise (e.g., as described herein, etc.). The ID application 114*b* then compiles a response to the OBO request, at 710, which includes the confirmation of the dependent user 110, the PII for the dependent user 110, and potentially the grant of permission. And, the ID application 114*b* transmits the response, at 712, to the engine 118.

Next in the method 700, the engine 118 receives the response to the OBO request and transmits, at 714, the PII therefrom to a temporary lock box (e.g., upon verifying that OBO permission has previously been granted by the dependent user 110 to the independent user 106 (e.g., as described above for the method 300, etc.), etc.). The temporary lock box may include a secure data structure in memory of the IDP 102, or otherwise, again where the PII may be encrypted and securely stored temporarily (such that the temporary lock box may not be permanent storage). Further, the engine 118 transmits, at 716, the grant of permission to the independent user 106 at the ID application 114*a*. Upon receipt, the ID application 114*a* authenticates, at 718, the independent user 108 and confirms, at 720, the authentication to the engine 118. The engine 118 then retrieves, at 722, the PII from the temporary lock box. The retrieval may include, for example, providing a request to the temporary lock box, which includes an identification of the dependent user 110 and/or the PII previously provided. The temporary lock box, in turn, retrieves the identified PII and transmits the same to the IDP 102. Thereafter, the engine 118 transmits, at 724, the PII to the independent user 110 at the ID application 114*a*, whereupon the PII is stored, at 726, in memory of the independent user's communication device 104 (e.g., in a secure element, etc.).

In addition, the engine 118 further transmits permission data associated with the granted permission for the independent user 106 to act on behalf of the dependent user 110, along with the PII, to the ledger 120, at 728. And again, as above, at 730, the ledger data structure 120 stores the permission data therein (e.g., linking, to the independent user 106, the permission given to the independent user 106 for the dependent user 110 and/or the corresponding permission data and PII; etc.).

FIG. 8 illustrates an exemplary method 800 for use in sharing PII for a dependent user, by an independent user, with a relying party. The exemplary method 800 is described as implemented in the system 110, with reference to the IDP 102, the engine 118, the ID application 114*a* at the communication device 104 of the independent user 106, and the relying party 112, and also with reference to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 800.

Initially in method 800, the independent user 106 has already been granted permission to share the PII of the dependent user 110 with one or more relying parties (including relying party 112). As such, the independent user 106 accesses, at 802, the relying party application 116*a*, at the communication device 104, with a request to share PII of the dependent user 110. The request may be made in connection with a new account at the relying party 112, or in connection with other activity on behalf of the dependent user 110. The relying party application 116*a*, and in particular, an SDK provided by the IDP 102 included therein, submits a login and share request to the IDP 102, at 804. The request includes, without limitation, an ID of the independent user 106 and, generally, an identification of the relying party 112.

The IDP 102, in turn, transmits, at 806, a login request to the independent user 106 at the communication device 104, and specifically, at the ID application 114*a*. The ID application 114*a* authenticates the independent user 106, at 808. Once authenticated, the ID application 114*a* requests, at 810, from the ledger data structure 120, a list of users for which the independent user 106 has permission to share PII and corresponding permission parameters associated with the users. The ledger data structure 120 responds to the request by providing, at 812, a list of the users for which the independent user 106 has permission to share PII (e.g., where the list includes user IDs, where the list may or may not include actual names, where the list may be scrollable and/or searchable, where the list may also include corresponding permission parameters associated with the users, etc.). The list, in this exemplary embodiment, includes the independent user 106 and the dependent user 110. In addition, upon receiving the list of users, the ID application 114*a* may also verify, at 813, that any permission parameters associated with the users and the sharing of their PII, etc. is consistent with the indicated relying party 112, the time of the requested sharing, the geographic location of the relying party 112, etc. (whereby certain users may be omitted from the list if one or more of such parameters is not satisfied, etc.).

Next, the list of users is displayed, at 814, to the independent user 106, via the ID application 114*a*, at the communication device 104. The list of users may be accompanied by a request to consent to share PII with the relying party 112 (as identified by the independent user 106 in the original request). In turn, the independent user 106, at 816, selects one of the users included in the list, which in this example is the dependent user 110, and consents to share the PII for the dependent user 110 with the relying party 112. Here, again, the engine 118 may verify that any permission parameters associated with the selected dependent user 110 and the sharing of his/her PII, etc. is consistent with the indicated relying party 112, time of the requested sharing, geographic location of the relying party 112, etc. In addition, the independent user 106 may select (from predefined options) or otherwise provide one or more limitations relating to use of the PII by the relying party 112, for example, a time limit on availability of the PII, an indication of particular PII being shared, limitations on use of the PII by the relying party 112 (e.g., payment related uses, non-payment related uses, etc.), etc.

With the identified user and the consent, the ID application 114a at the user's communication device 104 shares the PII for the dependent user 110, at 818, from the secure element of the communication device 104, with the IDP 102, and specifically the engine 118. The IDP 102, in turn, shares the PII for the dependent user 110 with the relying party 112, whereupon the activity initiated by the independent user 106 on behalf of the dependent user 110 is continued (e.g., an account is set up or opened, a reservation is made, consent to treat is granted, a medical file is viewable, a bill is paid, etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a computing device, an on-behalf-of (OBO) request from an independent user to provision personal identifying information (PII) for a dependent user to a first communication device of the independent user; (b) authenticating the dependent user at a second different communication device associated with the dependent user; (c) receiving, by the computing device, the PII from the dependent user; (d) transmitting, by the computing device, the PII to a secure data structure; (e) authenticating the independent user at the first communication device; (f) in response to authentication of the independent user, retrieving, by the computing device, the PII for the dependent user from the secure data structure; (g) transmitting, by the computing device, the PII to the independent user at the first communication device, whereby the PII is stored in a secure element at the first communication device for use on behalf of the dependent user; (h) receiving, by the computing device, the PII from the first communication device; (i) transmitting the PII received from the first communication device to a relying party, based on a request from the independent user and authentication of the independent user; (j) transmitting, by the computing device, to a ledger data structure, an indication of the permission granted by the dependent user to provision the PII for the dependent user to the first communication device of the independent user, whereby the permission given to the independent user for the dependent user is linked to the independent user in the ledger data structure; and (k) storing the PII for the dependent user in the secure data structure and/or the secure element of the first communication device associated with the independent user.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a computing device, an on-behalf-of (OBO) request from a dependent user to provision personal identifying information (PII) for the dependent user to a communication device of an independent user, the OBO request including the PII; (b) transmitting, by the computing device, the PII to a secure data structure; (c) transmitting, by the computing device, an authentication request to the communication device of the independent user requesting authentication of the independent user at the communication device; (d) in response to authentication of the independent user, retrieving, by the computing device, the PII for the dependent user from the secure data structure; (e) transmitting, by the computing device, the PII to the independent user at the communication device, whereby the PII is stored in a secure element at the communication device for use on behalf of the dependent user; (f) authenticating the independent user at the communication device; (g) transmitting, by the computing device, to a ledger data structure, an indication of the permission granted by the dependent user to provision the PII for the dependent user to the communication device of the independent user, whereby the permission given to the independent user for the dependent user is linked to the independent user in the ledger data structure; and (h) storing the PII for the dependent user in the secure data structure and/or the secure element of the communication device associated with the independent user.

As will further be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a computing device, from a communication device associated with a user, an on-behalf-of (OBO) request from the user to share permission data with a relying party, wherein the permission data is associated with personal identifying information (PII) but does not include the actual PII; (b) in response to the OBO request, generating, by the computing device, a permission request for the permission data and transmitting the permission request to the communication device associated with the user; (c) receiving, at the computing device, from the communication device associated with the user, consent from the user to share the permission data with the relying party, in response to the permission request and upon authentication of the user at the communication device; (d) identifying, by the computing device, in a data structure, an OBO permission for the user associated with the PII; and (e) in response to identifying the OBO permission for the user, transmitting, by the computing device, the permission data identified in the OBO request to the relying party.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in implementing stand-in network identities, the method comprising:
    receiving, by a computing device, an on-behalf-of (OBO) request from an independent user to provision personal identifying information (PII) for a dependent user to a first communication device of the independent user;
    authenticating the dependent user at a second different communication device associated with the dependent user;
    receiving, by the computing device, the PII from the dependent user;
    transmitting, by the computing device, the PII to a secure data structure;
    authenticating the independent user at the first communication device;
    in response to authentication of the independent user, retrieving, by the computing device, the PII for the dependent user from the secure data structure; and
    transmitting, by the computing device, the PII to the independent user at the first communication device, whereby the PII is stored in a secure element at the first communication device for use on behalf of the dependent user.

2. The computer-implemented method of claim 1, wherein the PII includes a mailing address, a phone number, and a government identification number.

3. The computer-implemented method of claim 1, further comprising:
    receiving, by the computing device, the PII from the first communication device; and
    transmitting the PII received from the first communication device to a relying party, based on a request from the independent user and authentication of the independent user.

4. The computer-implemented method of claim 1, wherein receiving the PII from the dependent user includes receiving confirmation of the OBO request from the dependent user.

5. The computer-implemented method of claim 1, wherein the secure data structure is at the computing device.

6. The computer-implemented method of claim 1, further comprising, in response to the OBO request, transmitting, by the computing device, a request to the second communication device for the PII; and
    wherein authenticating the dependent user includes authenticating the dependent user in response to the request for the PII.

7. The computer-implemented method of claim 6, further comprising transmitting, by the computing device, to a ledger data structure, an indication of the permission granted by the dependent user to provision the PII for the dependent user to the first communication device of the independent user, whereby the permission given to the independent user for the dependent user is linked to the independent user in the ledger data structure.

8. The computer-implemented method of claim 7, further comprising storing the PII for the dependent user in the secure data structure.

9. The computer-implemented method of claim 7, further comprising storing the PII for the dependent user in the secure element at the first communication device.

10. A computer-implemented method for use in implementing stand-in network identities, the method comprising:
    receiving, by a computing device, an on-behalf-of (OBO) request from a dependent user to provision personal identifying information (PII) for the dependent user to a communication device of an independent user, the OBO request including the PII;
    transmitting, by the computing device, the PII to a secure data structure;
    transmitting, by the computing device, an authentication request to the communication device of the independent user requesting authentication of the independent user at the communication device;

in response to authentication of the independent user, retrieving, by the computing device, the PII for the dependent user from the secure data structure; and transmitting, by the computing device, the PII to the independent user at the communication device, whereby the PII is stored in a secure element at the communication device for use on behalf of the dependent user.

11. The computer-implemented method of claim 10, further comprising authenticating the independent user at the communication device.

12. The computer-implemented method of claim 10, wherein the PII includes a mailing address, a phone number, and a government identification number.

13. The computer-implemented method of claim 10, further comprising:

receiving, by the computing device, the PII from the communication device; and transmitting the PII received from the communication device to a relying party, based on a request from the independent user and authentication of the independent user.

14. The computer-implemented method of claim 10, further comprising transmitting, by the computing device, to a ledger data structure, an indication of the permission granted by the dependent user to provision the PII for the dependent user to the communication device of the independent user, whereby the permission given to the independent user for the dependent user is linked to the independent user in the ledger data structure.

15. The computer-implemented method of claim 14, further comprising storing the PII for the dependent user in the secure data structure.

16. The computer-implemented method of claim 14, further comprising storing the PII for the dependent user in the secure element at the communication device of the independent user.

* * * * *